United States Patent
Beebe et al.

(10) Patent No.: US 7,090,003 B2
(45) Date of Patent: Aug. 15, 2006

(54) METHOD AND APPARATUS FOR TEMPERATURE CONTROL OF A MICROFLUIDIC DEVICE

(75) Inventors: David J. Beebe, Madison, WI (US); Glennys A. Mensing, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 232 days.

(21) Appl. No.: 10/273,309

(22) Filed: Oct. 17, 2002

(65) Prior Publication Data
US 2003/0136552 A1 Jul. 24, 2003

Related U.S. Application Data

(60) Provisional application No. 60/348,163, filed on Oct. 19, 2001.

(51) Int. Cl.
*F28D 7/10* (2006.01)
(52) U.S. Cl. ............ 165/140; 165/185; 165/139; 165/164; 422/68.1; 422/102; 435/287.2; 204/451; 204/453; 204/604
(58) Field of Classification Search ............ 165/170, 165/140, 164, 139, 185; 422/100, 68.1, 102–104; 435/6, 7.24, 287.2
See application file for complete search history.

(56) References Cited

U.S. PATENT DOCUMENTS

| | | | | |
|---|---|---|---|---|
| 5,115,858 A * | 5/1992 | Fitch et al. | .............. | 165/80.4 |
| 5,965,410 A * | 10/1999 | Chow et al. | .............. | 435/91.2 |
| 6,193,647 B1 | 2/2001 | Beebe et al. | .............. | 600/33 |
| 6,541,274 B1 * | 4/2003 | Nagle et al. | .............. | 436/180 |
| 6,572,830 B1 * | 6/2003 | Burdon et al. | .......... | 422/186.29 |
| 6,627,406 B1 * | 9/2003 | Singh et al. | .............. | 435/7.1 |
| 6,632,619 B1 * | 10/2003 | Harrison et al. | .......... | 435/7.2 |
| 6,645,432 B1 * | 11/2003 | Anderson et al. | .......... | 422/100 |
| 6,686,184 B1 * | 2/2004 | Anderson et al. | .......... | 435/174 |
| 6,692,700 B1 * | 2/2004 | Handique | ............ | 422/100 |
| 6,705,357 B1 * | 3/2004 | Jeon et al. | .............. | 141/9 |
| 2001/0041357 A1 * | 11/2001 | Fouillet et al. | .......... | 435/91.1 |
| 2002/0143437 A1 * | 10/2002 | Handique et al. | .......... | 700/266 |
| 2003/0049174 A1 * | 3/2003 | Ganesan | .............. | 422/82.02 |
| 2003/0175947 A1 * | 9/2003 | Liu et al. | .............. | 435/288.5 |
| 2003/0213580 A1 * | 11/2003 | Philpott et al. | .......... | 165/46 |
| 2004/0115838 A1 * | 6/2004 | Quake et al. | .......... | 436/538 |

* cited by examiner

OTHER PUBLICATIONS

Chiu et al. "Patterned deposition of cells and proteins onto surfaces by using three-dimensiona; microfluidic systems," Proc. Natl. Acad. Sci., published on the Internet Feb. 2000; published in print vol. 97, No. 6, pp. 2408–2419, Mar. 1998.*

*Primary Examiner*—Terrell McKinnon
(74) *Attorney, Agent, or Firm*—Boyle Fredrickson Newholm Stein & Gratz S.C.

(57) ABSTRACT

A microfluidic device is provided for regulating the temperature of a sample fluid flowing therethrough, as well as, a method of regulating the temperature of the sample fluid flowing through the microfluidic device. The microfluidic device includes a body member defining a fluid channel for allowing the sample fluid to flow therethrough and a first regulating channel. A regulating fluid having a predetermined temperature flows through the regulating channel adjacent the fluid channel so as to effectuate a heat exchange with the sample fluid flowing through the fluid channel to regulate the temperature thereof.

14 Claims, 2 Drawing Sheets

METHOD AND APPARATUS FOR TEMPERATURE CONTROL OF A MICROFLUIDIC DEVICE

CROSS-REFERENCE TO RELATED APPLICATIONS

This application claims the benefit of U.S. Provisional Application Ser. No. 60/348,163, filed Oct. 19, 2001.

REFERENCE TO GOVERNMENT GRANT

This invention was made with United States government support awarded by the following agencies: DOD ARPA F30602-00-2-0570. The United States has certain rights in this application.

FIELD OF THE INVENTION

This invention relates generally to microfluidic devices, and in particular, to a method and apparatus for controlling the temperature of a sample fluid flowing through a channel of a microfluidic device.

BACKGROUND AND SUMMARY OF THE INVENTION

As is known, microfluidic systems are being used in an increasing number of applications, including biological applications. These microfluidic systems are becoming more popular for several reasons. By way of example, it can be appreciated that microfluidic devices utilize very small volumes of fluids. Consequently, since such small volumes of fluid are used in microfluidic devices, it is more cost effective to do experiments that require very expensive reagents in microfluidic devices than in prior macro systems.

Often times, the various types of chemical and biological experiments conducted with microfluidic devices require controlled temperatures (e.g. PCR). In other words, these various chemical experiments require biological objects to be maintained at either constant temperatures or to be cycled so as to expose the biological object to various predetermined temperatures.

Currently, temperature control in microfluidic devices is accomplished using conventional external heating elements and/or cooling elements. These conventional heating and/or cooling elements require power sources such as batteries or the like. The use of such temperature control mechanisms not only adds significantly to the overall cost of the microfluidic device, such heating and cooling elements are often considerably larger than the microfluidic device itself. This, in turn, may render the microfluidic system too heavy or too large to be attractive to potential users. As such, it is highly desirable to provide a method and apparatus for controlling temperature in a microfluidic device that requires that no external power source.

It can be appreciated that various types of chemical reactions have corresponding endothermic or exothermic properties. While these reactions are sometimes performed with quite volatile chemistries that make for unsafe conditions at the macroscale, at the microscale, the small volumes required reduce the hazard and increase the practicality. In addition, chemical heat generation is more efficient than traditional heating methods (such as resistive heating). Consequently, utilizing the endothermic or exothermic properties of chemical reactions in temperature control becomes possible.

Therefore, it is a primary object and feature of the present invention to provide a method and apparatus for controlling a temperature of a sample fluid in a channel of a microfluidic device that requires no external power source.

It is a further object and feature of the present invention to provide a method and apparatus for controlling the temperature of a sample fluid in a channel of a microfluidic device that is less expensive than prior temperature control mechanisms for microfluidic devices.

It is a still further object and feature of the present invention to provide a method and apparatus for controlling a temperature of a sample fluid flowing through a channel of a microfluidic device that is simple and inexpensive to utilize.

In accordance with the present invention, a microfluidic device is provided for regulating the temperature of a sample fluid. The microfluidic device includes a body member defining a fluid channel for receiving the sample fluid therein and a first regulating channel. A regulating fluid having a predetermined temperature is provided in the first regulating channel. The regulating fluid effectuates a heat exchange with the sample fluid in the fluid channel.

In a first embodiment, the fluid channel has an outer periphery and the first regulating channel extends about the outer periphery of the fluid channel. In a second embodiment, the fluid channel extends generally along a longitudinal axis and the first regulating channel includes a first portion being a first predetermined distance from the fluid channel and a second portion being a second predetermined distance from the fluid channel.

The body member may include a maintenance channel and the microfluidic device may include a maintenance fluid in the maintenance channel. The maintenance fluid effectuates a heat exchange with the regulating fluid in the first regulating channel so as to maintain the temperature thereof. The first portion of the first regulating channel is a third predetermined distance from the maintenance channel and the second portion of the first regulating channel is a fourth predetermined distance from the maintenance channel. The body member may also include a second regulating channel having a second regulating fluid therein. The second regulating fluid has a temperature and effectuates the heat exchange with the sample fluid in the fluid channel. The second regulating channel includes a first portion being a first predetermined distance from the fluid channel and a second portion being a second predetermined distance from the fluid channel.

The body member may also include a first maintenance channel having a first maintenance fluid therein. The first maintenance fluid effectuates a heat exchange with the regulating fluid in the first regulating channel so as to maintain the temperature thereof. Similarly, the body member may include a second maintenance channel having a second maintenance fluid therein. The second maintenance fluid effectuates a heat exchange with the second regulating fluid in the second regulating channel so as to maintain the temperature thereof.

In accordance with a further aspect of the present invention, a microfluidic device is provided for regulating a temperature of a sample fluid. The microfluidic device includes a body member having a flow channel therethrough for receiving the sample fluid. A temperature regulating structure is provided within the body member. The temperature regulating structure includes a regulating fluid of a predetermined temperature therein for effectuating a heat exchange with the sample fluid in the flow channel.

The temperature regulating structure may wind around the flow channel at a predetermined distance therefrom. Alternatively, the temperature regulating structure may include a regulating channel passing through the body member. The regulating channel has a first portion being a first predetermined distance from the flow channel and a second portion being a second predetermined distance from the flow channel. The temperature regulating structure may also include a second regulating channel passing through the body member. The second regulating channel has a first portion being a first predetermined distance from the flow channel and a second portion being a second predetermined distance from the flow channel. The temperature regulating structure includes a second regulating fluid therein for effectuating a heat exchange with the sample fluid in the flow channel.

The temperature regulating structure may include a first maintenance channel passing through the body member having a first maintenance fluid therein. The first maintenance fluid in the first maintenance channel effectuates a heat exchange with the regulating fluid in the first regulating channel so as to maintain the predetermined temperature thereof. A second maintenance channel may also extend through the body member. The second maintenance channel has a second maintenance fluid therein. The second maintenance fluid effectuates a heat exchange with the second regulating fluid in the second regulating channel so as to maintain the predetermined temperature thereof.

In accordance with a still further object and feature of the present invention, a method of regulating the temperature of a sample fluid in a microfluidic device is provided. The method includes the steps of providing the sample fluid in a first channel within the microfluidic device and positioning a regulating fluid having a predetermined temperature adjacent the first channel so as to effectuate a heat exchange between the regulating fluid and the sample fluid.

The distance between the regulating fluid and the first channel may be varied. A first maintenance fluid having a predetermined temperature may be positioned adjacent the regulating fluid to maintain the predetermined temperature thereof. A second regulating fluid having a predetermined temperature may be positioned adjacent the first channel so as to effectuate a heat exchange between the second regulating fluid and the sample fluid. The distance between the second regulating fluid and the first channel may be varied. A second maintenance fluid having a predetermined temperature may be positioned adjacent the second regulating fluid to maintain the predetermined temperature thereof.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
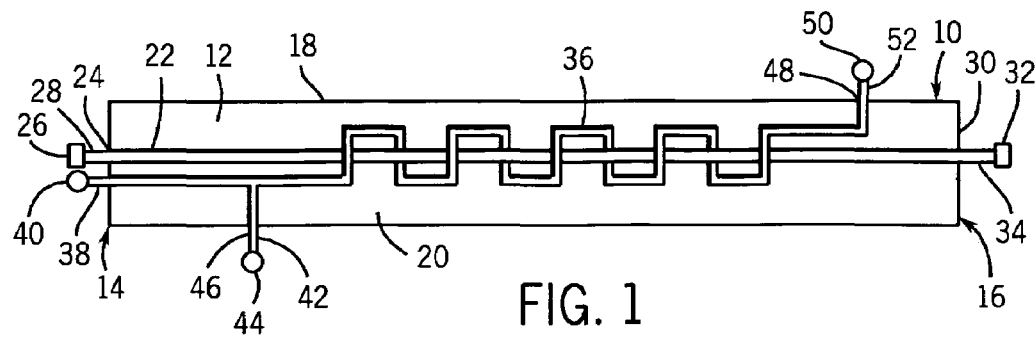
FIG. 1 is a schematic, top plan view of a first embodiment of a microfluidic device in accordance with the present invention.

Referring to FIG. 1, a microfluidic device in accordance with the present invention is generally designated by the reference numeral 10. Microfluidic device 10 includes a body 12 having first and second ends 14 and 16, respectively, and first and second sides 18 and 20, respectively. In addition, body 12 of microfluidic device 10 has a thickness so as to allow for a plurality of channels to be formed therein, as hereinafter described.

Sample fluid channel 22 is generally linear and extends through body 12 of microfluidic device 10. Sample fluid channel 22 includes an input 24 operatively connected to a fluid source 26 in any conventional manner such as by tube 28. In addition, output 30 of sample fluid channel 22 is operatively connected to a target 32 in any convention manner, such as by tube 34. It can be appreciated that sample fluid channel 22 allows sample fluid to flow from fluid source 26 to target 32 therethrough.

Body 12 of microfluidic device 10 further includes a temperature regulation channel 36 that wraps around sample fluid channel 22 in a serpentine fashion for reasons hereinafter described. Temperature regulation channel 36 has a first input 38 operatively connected to a source 40 of a first solution and a second input 42 operatively connected to a source 44 of a second solution. Output 48 of temperature regulation channel 36 is operatively connected to a discharge port 50 in any conventional manner, such as by tube 52.

It is contemplated that a user desired endothermic or exothermic reaction occur in response to the mixing of the first and second solutions provided at inputs 38 and 42, respectively, of temperature regulation channel 36. The mixture of the first and second solutions flows through temperature regulation channel 36 to the output 48 thereof in close proximity to sample fluid channel 22 so as to effectuate a heat exchange with the sample fluid flowing through sample fluid channel 22. It is intended that the temperature of the mixture of the first and second solutions flowing through temperature regulation channel 36 remain generally constant in order for the temperature of the sample fluid flowing through sample fluid channel 22 in body 12 to rise or fall to a user desired level. Thereafter, the mixture of first and second solutions flowing through temperature regulation channel 36 is discarded from discharge port 50 operatively connected to output 48 thereof.

Figure 3:
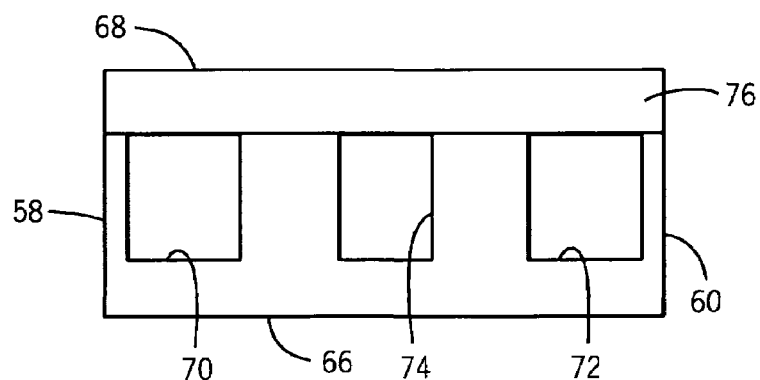
FIG. 3 is a cross-sectional view of the microfluidic device taken along line 3—3 of FIG. 2.
Figure 2:
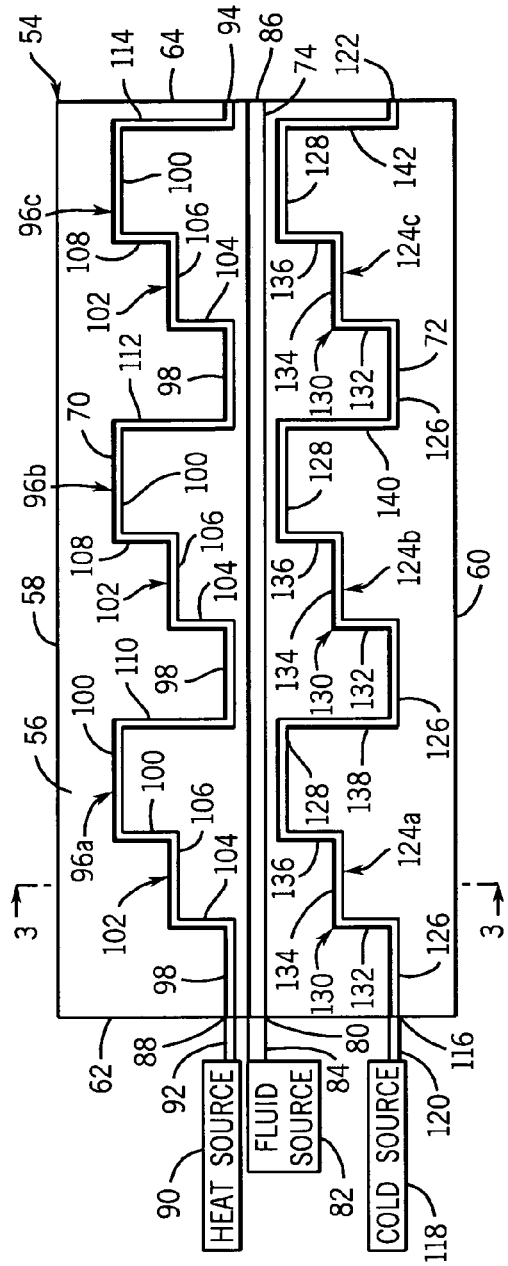
FIG. 2 is a schematic, top plan view of a second embodiment of a microfluidic device in accordance with the present invention.

Referring to FIGS. 2 and 3, an alternate embodiment of a microfluidic device in accordance with the present invention is generally designated by the reference numeral 54. Microfluidic device 54 is defined by a body 56 having lower and upper surfaces 66 and 68, respectively, and by a cover 76 affixed to upper surface 68 of body 56 by a bonding agent, adhesive or the like. In its assembled configuration, microfluidic device 54 includes first and second sides 58 and 60, respectively, and first and second ends 62 and 64, respectively. Upper surface 68 of body 56 includes heating channel 70, cooling channel 72, and fluid source channel 74 etched therein using any suitable micro-machining technique. Channels 70, 72 and 74 in upper surface 68 of body 56 are sealed by cover 76.

Fluid source channel 74 extends linearly through microfluidic device 54 and has an input 80 at first end 62 thereof that is operatively connected to a fluid source 82 in any conventional manner such as by tube 84. Sample fluid channel 74 terminates at an output 86 at second end 64 of microfluidic device 54 that is operatively connected to a target in any conventional manner. It is intended that sample fluid from fluid source 82 have the ability to flow through sample fluid channel 74 from input 80 to output 86.

Heating channel 70 includes an input 88 at first end 62 of microfluidic device 54 that is operatively connected to a heat source 90 in any conventional manner such as by tube 92. Heating channel 70 terminates at an output 94 at second end 64 of microfluidic device 54 that is operatively connected to a target in any conventional manner. Heating channel 70 further includes a plurality of temperature cycling sections 96a–c. Each temperature cycling section 96a–c of heating channel 70 includes a heating portion 98 generally parallel to and positioned adjacent sample fluid channel 74 and a non-heating portion 100 generally parallel to and spaced from sample fluid channel 74. Heating portions 98 of temperature cycling sections 96a–c of heating channel 70 are interconnected to corresponding non-heating portions 100 of temperature cycling sections 96a–c by intermediate portions 102. Each intermediate portion 102 includes an input passageway 104 perpendicular to and in communication with heating portion 98; a central passageway 106 generally parallel to heating portion 98 and in communication with input passageway 104; and an output passageway 108 communicating with central passageway 106 and with non-heating portion 100.

As best seen in FIG. 2, heating portion 98 of temperature cycling section 96a communicates with input 88 of heating channel 70 adjacent first end 62 of microfluidic device 54. Heating portions 98 of temperature cycling sections 96b and 96c are interconnected to and communicate with corresponding non-heating portions 100 of adjacent temperature cycling sections 96a and 96b, respectively, by connection sections 110 and 112, respectively. Connection section 114 interconnects non-heating portion 100 of temperature cycling section 96c to output 94 of heat channel 70 to allow communication therebetween. As described, heated fluid of a predetermined temperature from heat source 90 flows through heating channel 70 to output 94 in second end 64 of microfluidic device 54.

Cooling channel 72 includes an input 116 at first end 62 of microfluidic device 54 that is operatively connected to a cold source 118 in any conventional manner such as by tube 120. Cooling channel 72 terminates at an output 122 at second end 64 of microfluidic device 54 that is operatively connected to a target in any conventional manner. Cooling channel 72 further includes a plurality of temperature cycling sections 124a–c. Each temperature cycling section 124a–c of cooling channel 72 includes a first non-cooling portion 126 generally parallel to and spaced from sample fluid channel 74 and a cooling portion 128 generally parallel to and positioned adjacent sample fluid channel 74. Non-cooling portions 126 of temperature cycling sections 124a–c of cooling channel 72 are interconnected to and communicate with corresponding cooling portions 128 of temperature cycling sections 124a–c by intermediate portions 130. Each intermediate portion 130 of temperature cycling sections 124a–c of cooling channel 72 includes an input passageway 132 perpendicular to and in communication with non-cooling portion 126; a central passageway 134 generally parallel to non-cooling portion 126 and in communication with input passageway 132; and an output passageway 136 in communication with central passageway 134 and with cooling portion 128.

Non-cooling portion 126 of temperature cycling section 124a of cooling channel 72 communicates with input 116 of cooling channel 72 in first end 62 of microfluidic device 54. Non-cooling portions 126 of temperature cycling sections 124b and 124c communicate with cooling portions 128 of adjacent temperature cycling sections 124a and 124b, respectively, through connection sections 138 and 140, respectively. Connection section 142 allows cooling portion 128 of temperature cycling section 124c to communicate with output 94 of cooling channel 72 in second end 64 of microfluidic device 54. As described, cold fluid of a predetermined temperature from cold source 118 flows through cooling channel 72 to output 122 thereof.

As best seen in FIG. 2, the configurations of heating channel 70 and cooling channel 72 are substantially identical, but out of phase. As such, heating fluid from heat source 90 flowing through heating portions 98 of heating channel 70 and cooling fluid from cold course 118 flowing through cooling portions 128 of cooling channel 72 are alternately positioned adjacent to fluid source channel 74. As a result, the temperature of the sample fluid flowing through sample fluid channel 74 may be oscillated between maximum and minimum temperatures or, in other words, the temperature of the heating fluid flowing through heating channel 70 and the temperature of the cooling fluid flowing through cooling channel 72. The oscillation in temperature is produced by the movement of the fluids through heating channel 70 and cooling channel 72 toward and away from fluid source channel 74. It is contemplated to provide a heat sink (not shown) adjacent sample fluid channel 74 so as to expedite the cooling of the fluid flowing through sample fluid channel 74 during the transition from a maximum to a minimum temperature. It can be appreciated that the number of temperature cycling sections 96a–c of heating channel 70 and temperature cycling sections 124a–c of cooling channel 72 may be increased or decreased in order to optimize the number of temperature oscillations necessary for a given chemical experiment.

Figure 5:
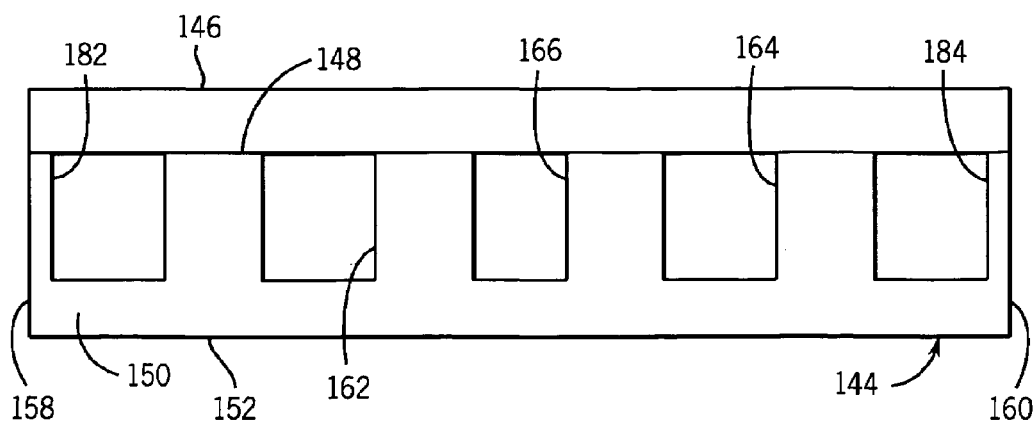
FIG. 5 is a cross-sectional view of the microfluidic device taken along line 5—5 of FIG. 4.
Figure 4:
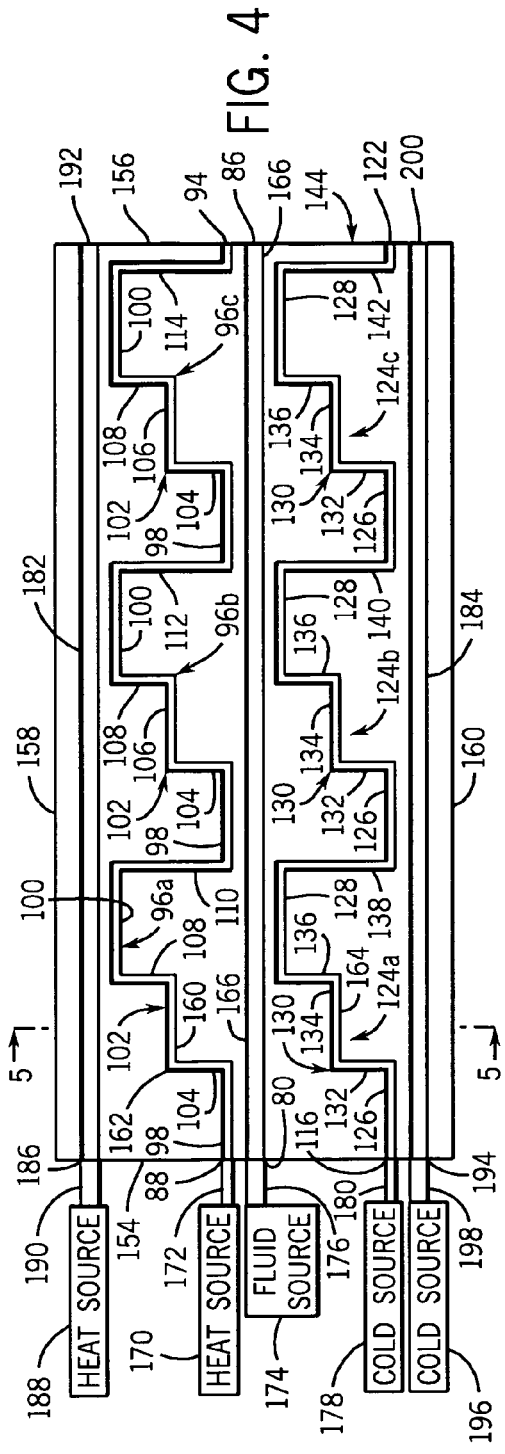
FIG. 4 is a schematic, top plan view of a third embodiment of a microfluidic device in accordance with the present invention.

Referring to FIGS. 4 and 5, a still further embodiment of a microfluidic device in accordance with the present invention is generally designated by the reference numeral 144. Microfluidic device 144 is defined by body 150 having upper and lower surfaces 148 and 152, respectively, and by a cover 146 affixed to upper surface 148 of body 150 by a bonding agent, adhesive or the like. In its assembled configuration, microfluidic device 144 includes first and second ends 154 and 156, respectively, and first and second sides 158 and 160, respectively. Upper surface 148 of body 150 includes heating channel 162, cooling channel 164 and fluid source channel 166 etched therein using any suitable micromachining technique.

Heating channel 162 of microfluidic device 144 is identical in structure to heating channel 70 of microfluidic device 54, and as such, the description heretofore of heating channel 70 of microfluidic device 54 is understood to describe heating channel 162 of microfluidic device 144 as if fully described herein. Similarly, cooling channel 164 and fluid source channel 166 etched in upper surface 148 of body 150 of microfluidic device 144 are identical to cooling channel 72 and fluid source channel 74 etched in upper surface 68 of body 56 of microfluidic device 54. As such, the description heretofore of cooling channel 72 and fluid source channel 74 of microfluidic device 54 are understood to describe cooling channel 164 and fluid source 166 of microfluidic device 144 as if fully described herein.

Input 88 of heating channel 162 at first end 154 of microfluidic device 144 is operatively connected to a heat source 170 in any conventional manner such as by tube 172. Output 94 of heating channel 162 at second end 156 of microfluidic device 144 is operatively connected to a target in any conventional manner. Input 80 of fluid source channel 166 at first end 154 of microfluidic device 144 is operatively connected to a fluid source 174 in any conventional manner such as by tube 176. Output 86 of sample fluid channel 166 at second end 156 of microfluidic device 144 is operatively connected to a target in any conventional manner. Input 116 of cooling channel 164 at first end 154 of microfluidic device 144 is operatively connected to a cold source 178 in any conventional manner such as by tube 180. Output 122 of cooling channel 164 at second end 156 of microfluidic device 144 is operatively connected to a target in any conventional manner.

Upper surface 148 of body 156 of microfluidic device 144 also includes a heat maintenance channel 182 and a cooling maintenance channel 184 etched therein using any suitable micro-machining technique. Heat maintenance channel 182 includes an input 186 at first end 154 of microfluidic device 144 that is operatively connected to a maintenance heat source 188 in any conventional manner such as by tube 190. Heat maintenance channel 182 terminates at an output 192 at second end 156 of microfluidic device 144 that is operatively connected to a target in any conventional manner. It is intended that maintenance heating fluid of a predetermined temperature from maintenance heat source 180 flow through heat maintenance channel 182 from input 186 to output 192 thereof. Cooling maintenance channel 184 extends linearly through microfluidic device 144 and has an input 194 at first end 154 thereof that is operatively connected to a maintenance cold source 196 in any conventional manner such as by tube 198. Cooling maintenance channel 184 terminates at an output 200 at second end 156 of microfluidic device 144 that is operatively connected to a target in any conventional manner. It is intended that maintenance cooling fluid of a predetermined temperature from maintenance cold source 198 flow through cooling maintenance channel 184 from input 194 to output 200 thereof.

As best seen in FIG. 4, the configurations of heating channel 162 and cooling channel 164 are substantially identical, but out of phase. As such, heating fluid from heat source 170 flowing through heating portions 98 of heating channel 162 and cooling fluid from cold source 178 flowing through cooling portions 128 of cooling channel 164 are alternately positioned adjacent to fluid source channel 166. As a result, the temperature of the sample fluid flowing through sample fluid channel 166 may be oscillated between maximum and minimum temperatures or, in other words, the temperature of the heating fluid flowing through heating channel 162 and the temperature of the cooling fluid flowing through cooling channel 164. The oscillations in temperature of the sample fluid are produced by the movement of the heating and cooling fluids through heating channel 162 and cooling channel 164, respectively, toward and away from fluid source channel 166. It is contemplated to provide a heat sink (not shown) adjacent sample fluid channel 166 so as to expedite the cooling of the sample fluid flowing through sample fluid channel 166 during each transition from a maximum to a minimum temperature. As heretofore described with respect to microfluidic device 54, the number of temperature cycling sections 96a–c of heating channel 162 and the number of temperature cycling sections 124a–c of cooling channel 164 may be increased or decreased in order to optimize the number of temperature oscillations necessary for a given chemical experiment.

Further, it can be understood that the heating fluid flowing through heating channel 162 may dissipate heat as the heating fluid flows from first end 154 to second end 156 of microfluidic device 144 thereby reducing the temperature to which the sample fluid flowing through fluid source channel 166 is exposed during a heating cycle. In order to maintain the temperature of the heating fluid flowing through heating channel 162 from first end 154 to second end 156 of microfluidic device 144, a heat exchange is effectuated between the maintenance heating fluid flowing through heat maintenance channel 182 and the heating fluid flowing through non-heating portions 100 of temperature cycling sections 96a–c of heating channel 162. As a result, the temperature of the heatling fluid flowing through heating channel 162 from first end 154 to second end 156 of microfluidic device 144 is maintained.

Similarly, it can be understood that the cooling fluid flowing through cooling channel 164 may absorb heat as the cooling fluid flows from first end 154 to second end 156 of microfluidic device 144 thereby increasing the temperature to which the sample fluid flowing through fluid source channel 166 is exposed during a cooling cycle. In order to maintain the temperature of the cooling fluid flowing through cooling channel 164 from first end 154 to second end 156 of microfluidic device 144, a heat exchange is effectuated between the maintenance cooling fluid flowing through cooling maintenance channel 184 and the cooling fluid flowing through non-cooling portions 126 of temperature cycling sections 124a–c of cooling channel 164. As a result, the temperature of the cooling fluid flowing through cooling channel 164 from first end 154 to second end 156 of microfluidic device 144 is maintained.

It is understood that the heating fluids and cooling fluids heretofore described as flowing through microfluidic device 10 are generated by means of chemical reactions within corresponding channels. User desired endothermic and exothermic properties may be generated by various types of chemical reactions such as: forming a compound; decomposing a compound; reacting multiple compounds or changing the phase of a compound. These chemical reactions may occur by mixing, combustion, solidification or liquefaction of various compounds within corresponding channels of microfluidic device 10.

Various modes of carrying out the invention are contemplated as being within the scope of the following claims particularly pointing out and distinctly claiming the subject matter which is regarded as the invention.

We claim:

1. A microfludic device for regulating the temperature of a sample fluid, comprising:

a body member defining a fluid channel for receiving the sample fluid therein, a maintenance channel, a first regulating channel, and a second regulating channel, the fluid channel extending generally along a longitudinal axis and the first regulating channel including a first portion being a first predetermined distance from the fluid channel and a second portion being a second predetermined distance from the fluid channel;

a first regulating fluid having a predetermined temperature and being flowable within the first regulating channel, the first regulating fluid effectuating a heat exchange with the sample fluid in the fluid channel;

a second regulating fluid having a predetermined temperature and being disposed in the second regulating channel, the second regulating fluid effectuating a heat exchange with the sample fluid in the fluid channel; and a maintenance fluid in the maintenance channel, the maintenance fluid effectuating a heat exchange with the regulating fluid in the first regulating channel so as to maintain the temperature thereof.

2. The microfluidic device of claim 1 wherein the fluid channel has an outer periphery and wherein first regulating channel extends about the outer periphery of the fluid channel.

3. The microfluidic device of claim 1 wherein the first portion of the first regulating channel is a third predetermined distance from the maintenance channel and wherein the second portion of the first regulating channel is a fourth predetermined distance from the maintenance channel.

4. The microfluidic device of claim 1 wherein the second regulating channel includes a first portion being a first predetermined distance from the fluid channel and a second portion being a second predetermined distance from the fluid channel.

5. The microfluidic device of claim 1 wherein the body member includes a second maintenance channel and wherein the device further comprises a second maintenance fluid in the second maintenance channel, the second maintenance fluid effectuating a heat exchange with the second regulating fluid in the second regulating channel so as to maintain the temperature thereof.

6. The microfluidic device of claim 5 wherein the first portion of the first regulating channel is a third predetermined distance from the maintenance channel and wherein the second portion of the first regulating channel is a fourth predetermined distance from the maintenance channel.

7. A microfluidic device for regulating the temperature of a sample fluid, comprising:
   a body member having a flow channel therethough for receiving the sample fluid; and
   a temperature regulating structure within the body member, the temperature regulating structure including;
      a first regulating fluid of a predetermined temperature for effectuating a heat exchange with the sample fluid in the flow channel;
      a second regulating fluid of a second predetermined temperature for effectuating a heat exchange with the sample fluid in the flow channel;
      a first maintenance channel passing through the body member; and
      a first maintenance fluid in the first maintenance channel, the first maintenance fluid effectuating a heat exchange with the regulating fluid in the first regulating channel so as to maintain the predetermined temperature thereof.

8. The microfludic device of claim 7 wherein the temperature regulating structure winds around the flow channel at a predetermined distance therefrom.

9. The microfluidic device of claim 7 wherein the temperature regulating structure includes a regulating channel passing through the body member, the regulating channel having a first portion being a first predetermined distance from the flow channel and a second portion being a second predetermined distance from the flow channel.

10. The microfluidic device of claim 9 wherein the temperature regulating structure includes a second regulating channel passing through the body member, the second regulating channel having a first portion being a first predetermined distance from the flow channel and a second portion being a second predetermined distance from the flow channel.

11. The microfluidic device of claim 7 wherein the temperature regulating structure includes:
   a second maintenance channel passing through the body member; and
   a second maintenance fluid in the second maintenance channel, the second maintenance fluid effectuating a heat exchange with the second regulating fluid in the second regulating channel so as to maintain the predetermined temperature thereof.

12. A method of regulating the temperature of a sample fluid in a microfluidic device, comprising the steps of:
   providing the sample fluid in a first channel within the microfluidic device;
   positioning a first regulating fluid having a predetermined temperature adjacent the first channel so as to effectuate a heat exchange between the first regulating fluid and the sample fluid;
   positioning a second regulating fluid having a predetermined temperature adjacent the first channel so as to effectuate a heat exchange between the second regulating fluid and the sample fluid;
   varying the distance between first the regulating fluid and the first channel;
   varying the distance between the second regulating fluid and the first channne; and
   positioning a maintenance fluid having a predetermined temperature adjacent the second regulating fluid to maintain the predetermined temperature of the second regulating fluid.

13. The method of claim 12 wherein the first regulating fluid undergoes a chemical reaction, the chemical reaction having an endothermic property.

14. The method of claim 12 wherein the first regulating fluid undergoes a chemical reaction, the chemical reaction having an exothermic property.

* * * * *